United States Patent
Ma et al.

(10) Patent No.: US 11,728,733 B2
(45) Date of Patent: Aug. 15, 2023

(54) MULTI-INPUT SINGLE-OUTPUT CIRCUIT AND CONTROL METHOD THEREOF

(71) Applicant: Silergy Semiconductor Technology (Hangzhou) LTD, Hangzhou (CN)

(72) Inventors: Yunliang Ma, Hangzhou (CN); Lingdong Zhang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 105 days.

(21) Appl. No.: 16/985,408

(22) Filed: Aug. 5, 2020

(65) Prior Publication Data

US 2021/0050788 A1   Feb. 18, 2021

(30) Foreign Application Priority Data

Aug. 15, 2019 (CN) .......................... 201910753364.X (51) Int. Cl.
*H02M 3/158* (2006.01)
*H02M 1/00* (2006.01)
*H02J 1/08* (2006.01)

(52) U.S. Cl.
CPC ....... *H02M 3/1584* (2013.01); *H02M 1/0016* (2021.05); *H02J 1/082* (2020.01); *H02M 1/0025* (2021.05)

(58) Field of Classification Search
CPC ..... H02M 3/155–1588; H02M 1/0025; H02M 1/0045
See application file for complete search history.

(56) References Cited

U.S. PATENT DOCUMENTS

| | | | |
|---|---|---|---|
| 6,150,803 A * | 11/2000 | Varga | H02M 3/1584 323/282 |
| 7,696,735 B2 | 4/2010 | Oraw et al. | |
| 7,907,429 B2 | 3/2011 | Ramadass et al. | |
| 9,287,772 B2 * | 3/2016 | Hussien | H02M 1/36 |
| 9,685,870 B2 * | 6/2017 | Wang | H02M 5/293 |
| 9,898,021 B2 * | 2/2018 | Hsieh | G05F 1/56 |
| 2014/0139198 A1 * | 5/2014 | Manlove | H02M 3/156 323/282 |
| 2016/0218618 A1 * | 7/2016 | Yin | H02M 3/285 |
| 2017/0104407 A1 * | 4/2017 | Boncato | H02M 3/04 |
| 2020/0413513 A1 * | 12/2020 | Mohan | H05B 45/355 |

* cited by examiner

*Primary Examiner* — Peter M Novak (57) ABSTRACT

A multi-input single-output circuit can include: a first circuit module configured to receive a first input voltage source, and including a first power switch; a second circuit module configured to receive a second input voltage source, and including a switching power converter, where the switching power converter comprises a second power switch; and a control circuit configured to control one of the first and second circuit modules to supply power for a load, or to stop supplying power for the load, according to states of the first and second input voltage sources and control parameters of the circuit module that is in operation.

20 Claims, 6 Drawing Sheets

MULTI-INPUT SINGLE-OUTPUT CIRCUIT AND CONTROL METHOD THEREOF

RELATED APPLICATIONS

This application claims the benefit of Chinese Patent Application No. 201910753364.X, filed on Aug. 15, 2019, which is incorporated herein by reference in its entirety.

FIELD OF THE INVENTION

The present invention generally relates to the field of power electronics, and more particularly to multi-input single-output circuits and control methods thereof.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

For multi-input single-output (MISO) circuits, which are also referred to as multiple-input single output circuits, one of the input circuits may be selected to operate first according to different applications, in order to improve the efficiency of the system. Typically, active control can used to realize the control, but this approach may increase the complexity of the control.

In one embodiment, a multi-input single-output circuit can include: (i) a first circuit module configured to receive a first input voltage source, and including a first power switch; (ii) a second circuit module configured to receive a second input voltage source, and including a switching power converter, where the switching power converter comprises a second power switch; and (iii) a control circuit configured to control one of the first and second circuit modules to supply power for a load, or to stop supplying power for the load, according to states of the first and second input voltage sources and control parameters of the circuit module that is in operation.

In one embodiment, a control method for a multi-input single-output circuit including a first circuit module having a first power switch, and a second circuit module having a switching power converter, where the first circuit module receives a first input voltage source, and the second circuit module receives a second input voltage source, can include: (i) controlling one of the first and second circuit modules to supply power for a load, or to stop supplying power for the load, according to states of the first and second input voltage sources and control parameters of the circuit module being in operation; and; and (ii) where the first power switch operates in a linear state, and a second power switch in the second circuit module operates in a switching state.

Figure 1:
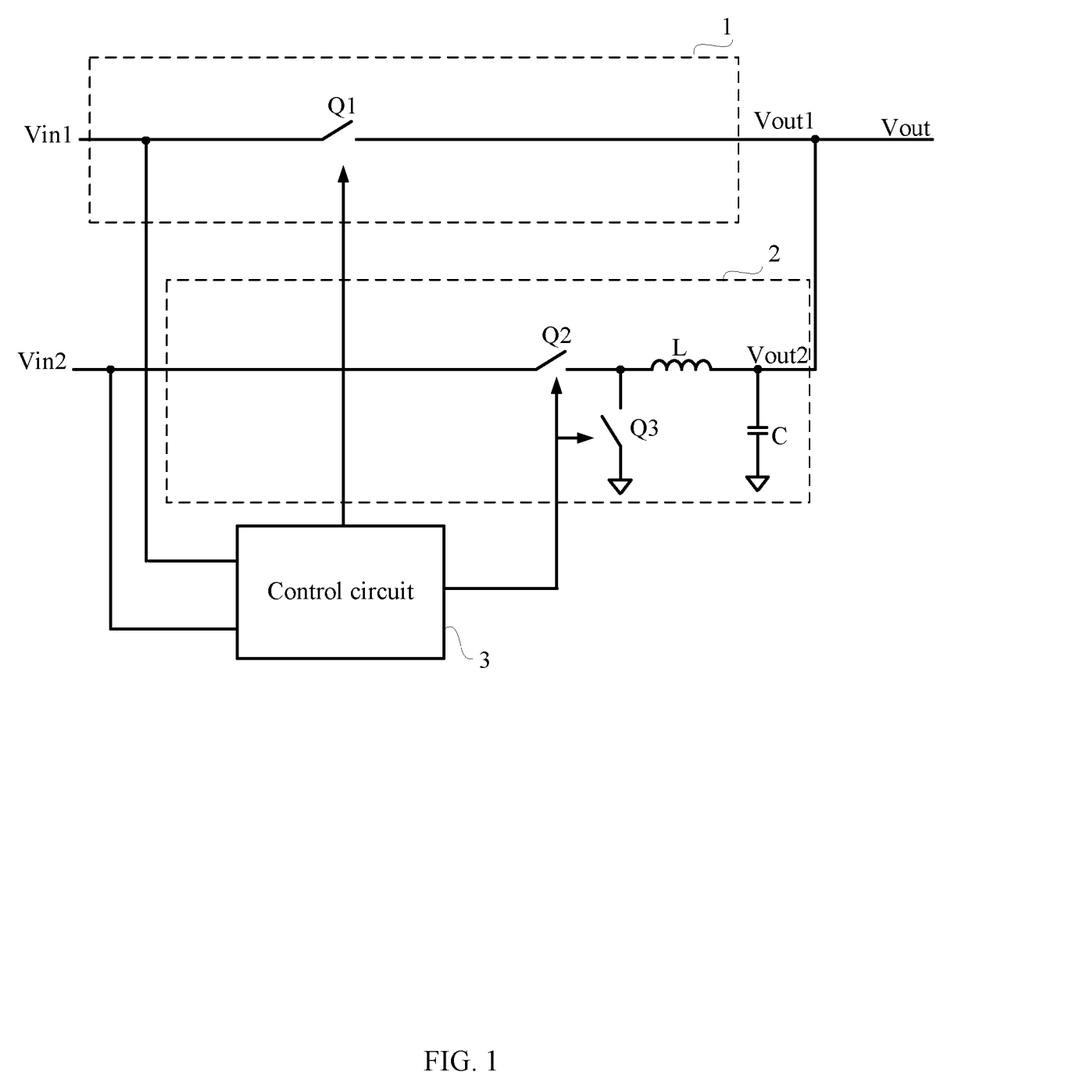
FIG. 1 is a schematic block diagram of a first example multi-input single-output circuit, in accordance with embodiments of the present invention.

Referring now to FIG. 1, shown is a schematic block diagram of a first example multi-input single-output circuit, in accordance with embodiments of the present invention. In this particular example, the multi-input single-output circuit can include circuit module 1, circuit module 2, and control circuit 3. As used herein, a "circuit module" can be hardware circuitry, such as one fabricated on a portion of an integrated circuit (IC). Circuit module 1 may receive input voltage source Vin1, and circuit module 2 may receive input voltage source Vin2. Output ports of circuit modules 1 and 2 can connect in parallel to generate output voltage Vout. For example, circuit module 1 can include power switch Q1 controlled to operate in a linear state. Circuit module 2 can include a buck converter which can include power switches Q2 and Q3, inductor L, and output capacitor C. In some cases, power switch Q3 can be replaced by a rectifier diode. For example, circuit module 1 can generate output voltage Vout1, and circuit module 2 can generate output voltage Vout2. In addition, the exemplary buck converter can be replaced by any other suitable switching power converter in certain embodiments. Control circuit 3 can control the output signals (voltage and/or current) of circuit modules 1 and 2, in order to realize smooth switching between circuit modules 1 and 2 according to the states of input voltage sources Vin1 and Vin2 (e.g., whether provided to the circuit module, the value of input voltage sources Vin1 and Vin2, or the maximum output power). In such a case, one of circuit modules 1 and 2 in the multi-input single-output circuit can be predetermined to operate to meet different demands.

Figure 2:
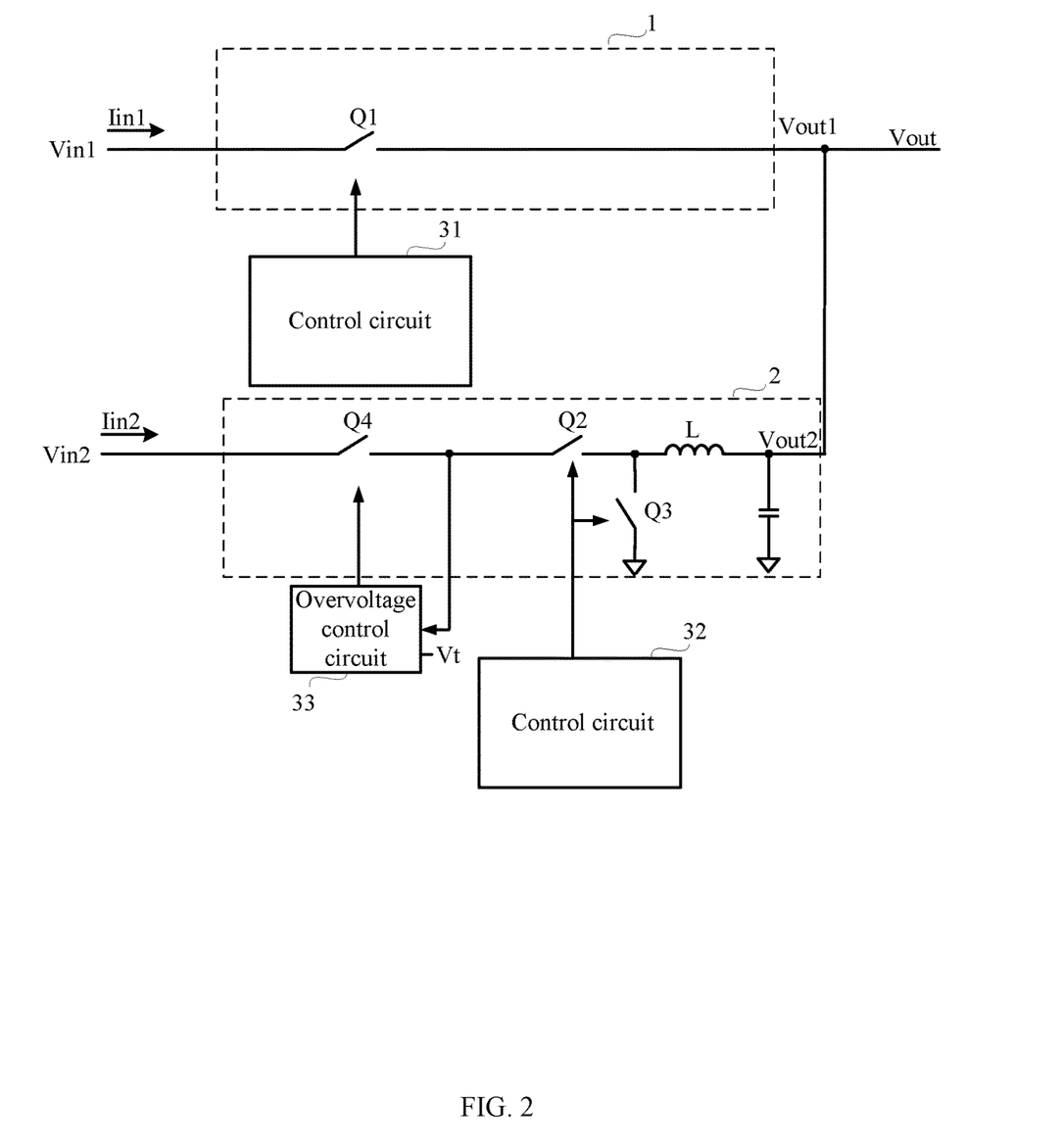
FIG. 2 is a schematic block diagram of a second example multi-input single-output circuit, in accordance with embodiments of the present invention.

Referring now to FIG. 2, shown is a schematic block diagram of a second example multi-input single-output circuit, in accordance with embodiments of the present invention. In this particular example, the multi-input single-output circuit can include circuit modules 1 and 2, and the control circuitry. For example, the control circuitry can include control circuits or sub-circuits 31 and 32. For example, control circuit 31 can control power switch Q1 in circuit module 1 to operate in a linear state/region, and control circuit 32 can control power switches Q2 and Q3 to be turned on or off (fully on/off in a switching mode).

In some embodiments, circuit module 2 can also include power switch Q4, connected between input voltage source Vin2 and an input terminal of the buck converter (e.g., between input voltage source Vin2 and one terminal of power switch Q2). The control circuit can include overvoltage control circuit 33 that can control power switch Q4 to be turned on or off. For example, power switch Q4 can be turned on and circuit module 2 may operate normally when input voltage source Vin2 is not greater than overvoltage protection threshold Vt. Also for example, power switch Q4 can be turned off when input voltage source Vin2 is greater than overvoltage protection threshold Vt, in order to realize overvoltage protection for the circuit. While only two input circuit modules are exemplified here, any number can be employed in certain embodiments.

Figure 3:
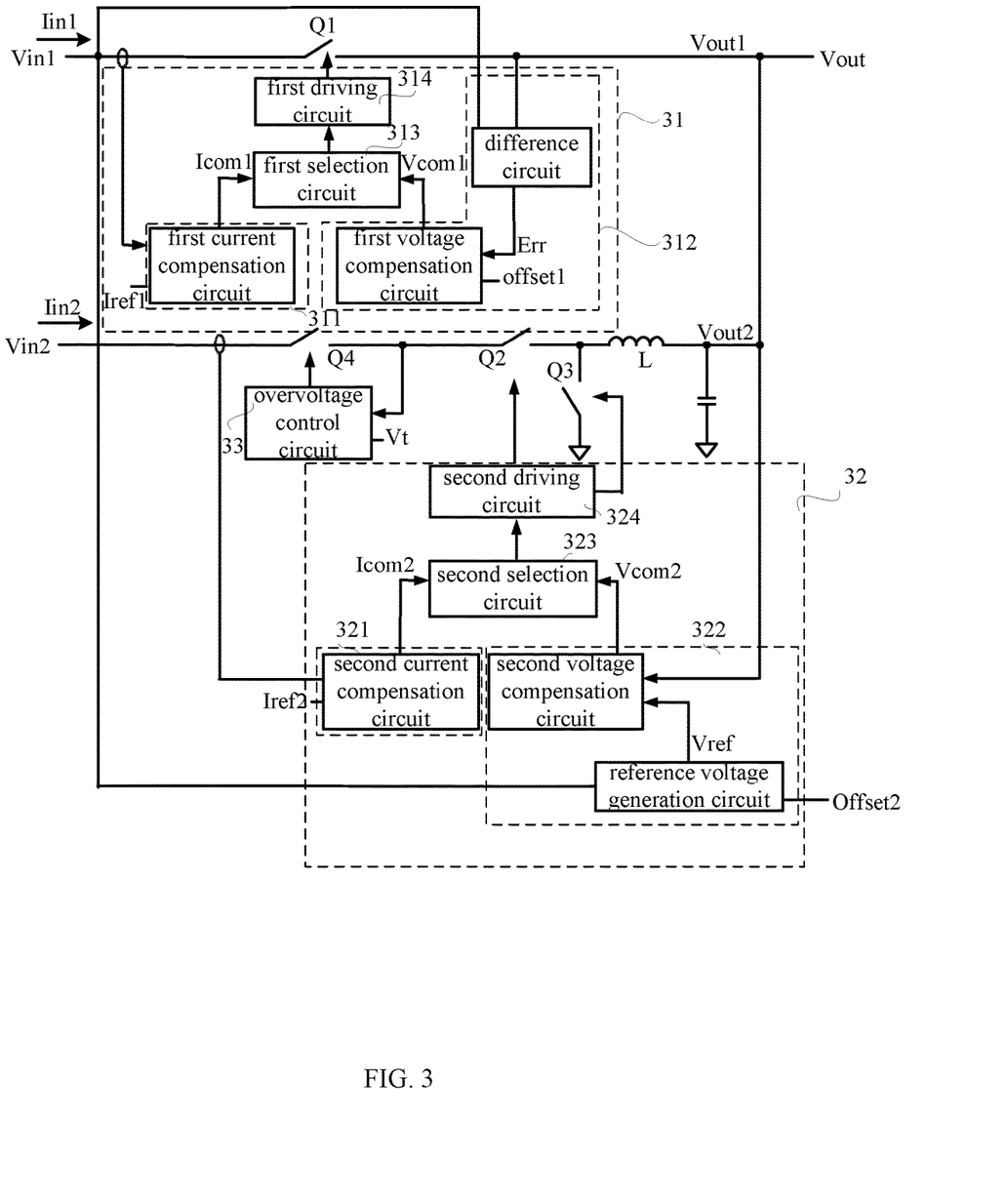
FIG. 3 is a schematic block diagram of a first example control circuit of the multi-input single-output circuit, in accordance with embodiments of the present invention.

Referring now to FIG. 3, shown is a schematic block diagram of a first example control circuit of the multi-input single-output circuit, in accordance with embodiments of the present invention. In certain embodiments, circuit module 2 may operate prior to circuit module 1 operating. In this particular example, control circuit 31 can include current control circuit 311, voltage control circuit 312, and selection circuit 313, and can control circuit module 1 to switch to operate in a voltage control mode or in a current control mode. For example, current control circuit 311 can include a first current compensation circuit. The first current compensation circuit may receive reference current Iref1 and input current Iin1, in order to generate current compensation signal Icom1, such that input current Iin1 can be maintained at reference current Iref1.

For example, voltage control circuit 312 can include a difference circuit and a first voltage compensation circuit. The difference circuit can obtain difference signal Err between input voltage source Vin1 and output voltage Vout1. The first voltage compensation circuit can compare difference signal Err against threshold offset1 to generate voltage compensation signal Vcom1, in order to maintain difference signal Err at threshold offset1; that is, Vin1−Vout1=offset1. Selection circuit 313 can compare current compensation signal Icom1 against voltage compensation signal Vcom1, in order to select the smaller one as a control signal. Control circuit 31 can also include driving circuit 314 that may generate a driving signal for power switch Q1, in accordance with the control signal generated by selection circuit 313.

For example, threshold offset1 can be 30 mV, such that output voltage Vout1 can be controlled to be slightly less than input voltage source Vin1. Control circuit 32 can include current control circuit 321, voltage control circuit 322, and selection circuit 323, and can control circuit module 2 to switch to operate in a voltage control mode or a current control mode. For example, current control circuit 321 can include a second current compensation circuit. The second current compensation circuit may receive reference current Iref2 and input current Iin2, in order to generate current compensation signal Icom2, such that input current Iin2 can be maintained at reference current Iref2.

Voltage control circuit 322 can include a reference voltage generation circuit and a second voltage compensation circuit. For example, the reference voltage generation circuit can generate different reference voltages Vref in different applications. The second voltage compensation circuit can compare output voltage Vout2 against reference voltage Vref, in order to generate voltage compensation signal Vcom2, such that output voltage Vout2 can be maintained at reference voltage Vref. Selection circuit 323 can compare current compensation signal Icom2 against voltage compensation signal Vcom2, in order to select the smaller one as a control signal. Control circuit 32 can also include driving circuit 324 that may generate a driving signal for power switches Q2 and Q3, in accordance with the control signal generated by selection circuit 323.

Figure 4:
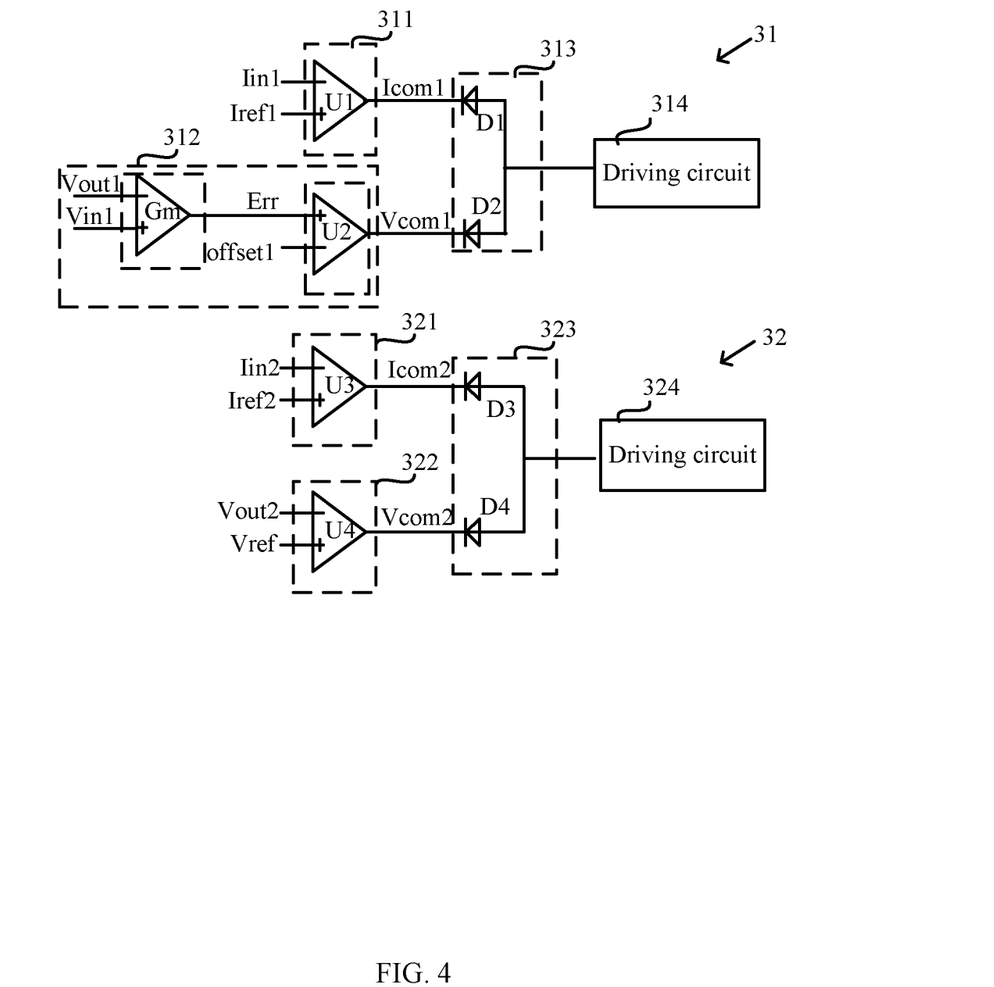
FIG. 4 are schematic block diagrams of example first and second control sub-circuits of the first example control circuit, in accordance with embodiments of the present invention.

Referring now to FIG. 4, shown are schematic block diagrams of first and second control sub-circuits of the first example control circuit, in accordance with embodiments of the present invention. In this particular example, the first current compensation circuit in current control circuit 311 can include error amplifier U1. For example, the non-inverting input terminal of error amplifier U1 may receive reference current Iref1, the inverting input terminal of error amplifier U1 may receive input current Iin1, and an output terminal of error amplifier U1 can generate current compensation signal Icom1, in order to control input current Iin1 to be maintained at reference current Iref1. It should be understood that the first current compensation circuit can further include RC compensation network. In addition, the difference circuit in voltage control circuit 312 can include error amplifier U2.

For example, input terminals of error amplifier Gm may receive input voltage source Vin1 and output voltage Vout1, and an output terminal of error amplifier Gm can generate difference signal Err, in order to represent the difference between input voltage source Vin1 and output voltage Vout1. The first voltage compensation circuit can include error amplifier U2. For example, input terminals of error amplifier U2 may receive threshold offset1 and difference signal Err, and an output terminal of error amplifier U2 can generate voltage compensation signal Vcom1, in order to maintain the difference between input voltage source Vin1 and output voltage Vout1 at threshold offset1. Selection circuit 313 can include diodes D1 and D2. For example, the cathode of diode D1 and the cathode of diode D2 may be respectively connected with current compensation circuit 311 and voltage compensation circuit 312. Both the anodes of diodes D1 and D2 can connect together with driving circuit 314. Thus, driving circuit 314 may receive the lower one of current compensation signal Icom1 and current compensation signal Vcom1. The second current compensation circuit in current control circuit 321 can include error amplifier U3. For example, the non-inverting input terminal of error amplifier U3 may receive reference current Iref2, the inverting input terminal of error amplifier U3 may receive input current Iin2, and an output terminal of error amplifier U3 can generate current compensation signal Icom2, in order to control input current Iin2 to be maintained at reference current Iref2.

The second voltage compensation circuit in voltage control circuit 322 can include error amplifier U4. For example, the non-inverting input terminal of error amplifier U4 may receive reference voltage Vref, the inverting input terminal of error amplifier U4 may receive output voltage Vout2, and an output terminal of error amplifier U4 can generate voltage compensation signal Vcom2, in order to control output voltage Vout2 to be maintained at reference voltage Vref. In addition, reference voltage Vref may be adjusted to be the sum of first input voltage Vin1 and threshold offset2 when input voltage source Vin1 supplies power for circuit module 1. Selection circuit 323 can include diodes D3 and D4. For example, the cathode of diode D3 and the cathode of diode D4 can respectively connect with current compensation circuit 321 and voltage compensation circuit 322. Both the anodes of diodes D3 and D4 can connect together with driving circuit 324. Moreover, driving circuit 324 may receive the lesser one of current compensation signal Icom2 and voltage compensation signal Vcom2.

Combing FIGS. 3 and 4, since circuit module 2 can be selected to operate prior to circuit module 1 in the system, the multi-input single-output circuit may have five operation states. When the multi-input single-output circuit is to generate a stable voltage and input voltage source Vin1 supplies power for circuit module 1, and input voltage source Vin2 doesn't supply power for circuit module 2, circuit module 1 can be controlled to operate under the voltage control mode first to keep the difference between input voltage source Vin1 and output voltage Vout1 at threshold offset1. As the load increases, input current Iin1 can increase. When input current Iin1 reaches the level of reference current Iref1, current compensation signal Icom1 may be less than voltage compensation signal Vcom1. Then, circuit module 1 can switch to operate under the current control mode, in order to keep input current Iin1 at reference current Iref1. When the multi-input single-output circuit is to limit the input current and input voltage source Vin1 supplies power for circuit module 1, and input voltage source Vin2 doesn't supply power for circuit module 2, circuit module 1 can operate under the current control mode directly. In that case, input current Iin1 can be maintained as reference current Iref1. In the two cases above, circuit module 2 may not operate (e.g., be disabled).

When the multi-input single-output circuit is to generate a stable voltage and input voltage source Vin2 supplies power for circuit module 2, and input voltage source Vin1 doesn't supply power for circuit module 1, circuit module 2 can be controlled to operate under the voltage control mode first to keep output voltage Vout2 at reference voltage Vref. For example, reference voltage Vref may be set to be any voltage as long as the voltage is less than input voltage source Vin2 to meet different demands. As the load increases, input current Iin2 can gradually increase. When input current Iin2 reaches the level of reference current Iref2, current compensation signal Icom2 may be less than voltage compensation signal Vcom2. Then, circuit module 2 can switch to operate under the current control mode to keep input current Iin2 at reference current Iref2. When the multi-input single-output circuit is to limit the input current and input voltage source Vin2 supplies power for circuit module 2, and input voltage source Vin1 doesn't supply power for circuit module 1, circuit module 2 may operate under the current control mode directly. In that case, input current Iin2 can be maintained at reference current Iref2. In the two cases above, when input voltage source Vin2 can be greater than overvoltage protection threshold Vt, and power switch Q4 may be turned off according to overvoltage control circuit 33, in order to realize overvoltage protection.

In one case, input voltage source Vin2 can be provided to circuit module 2 after input voltage source Vin1 is provided to circuit module 1. Before input voltage source Vin2 supplies power for circuit module 2, circuit module 1 can be controlled to operate under the voltage control mode, in order to keep the difference between input voltage source Vin1 and output voltage Vout1 at threshold offset1; that is, output voltage Vout1 is maintained to be Vin1−offset1. In addition, when input current Iin1 reaches the level of reference current Iref1, current compensation signal Icom1 may be less than voltage compensation signal Vcom1. Then, selection circuit 313 can select current compensation signal Icom1 as the control signal, such that circuit module 1 may switch to operate under the current control mode, in order to keep input current Iin1 at reference current Iref1.

Since circuit module 2 may preferentially operate in the system, voltage control circuit 322 can sample input voltage source Vin1 first when input voltage source Vin2 is provided to circuit module 2, in order to set reference voltage Vref to be the sum of input voltage source Vin1 and threshold offset2, which is greater than input voltage source Vin1. In one example, threshold offset2 can be set to be 100 mV. After that, circuit control module 2 can operate to maintain output voltage Vout2 at reference voltage Vref (e.g., equal to the sum of input voltage source Vin1 and threshold offset2) after the soft-start process. When output voltage Vout2 is provided to circuit module 2, circuit module 1 may switch to operate under the voltage control mode. Then, the conduction state of power switch Q1 can be adjusted by voltage control circuit 312, in order to control the difference between input voltage source Vin1 and output voltage Vout1 to be threshold offset1. Since output voltage Vout2 is greater than input voltage source Vin1, voltage compensation signal Vcom1 can be zero and selected to be the control signal to control power switch Q1 to be turned off. Then, circuit module 1 may stop operating. In certain embodiments, circuit module 2 may preferentially operate in the system, in order to supply power for the load without extra control.

As the load increases, input current Iin2 may gradually increase until input current Iin2 reaches the level of reference current Iref2. Then, current compensation signal Icom2 can be selected by selection circuit 323 as the control signal, and circuit module 2 may switch to operate under the current control mode to keep input current Iin2 at reference current Iref2. If the load continues to increase, output voltage Vout2 can gradually decrease. When output voltage Vout2 decreases to be the difference between input voltage source Vin1 and threshold offset1, voltage control circuit 312 can adjust the conduction state of power switch Q1, in order to control output voltage Vout1 to be the difference between input voltage source Vin1 and threshold offset1. That is, output voltage Vout of the multi-input single-output circuit may remain at the difference between input voltage source Vin1 and threshold offset1. After that, input voltage sources Vin1 and Vin2 may jointly provide power for the system, in order to share the input current.

In one case, input voltage source Vin1 may be provided to circuit module 1 after input voltage source Vin2 is provided to circuit module 2. Before input voltage source Vin1 is provided to circuit module 1, circuit module 2 can be controlled to operate under the voltage mode, in order to keep output voltage Vout2 at reference voltage Vref. In that case, reference voltage Vref may be a desired voltage for the system. In addition, current control circuit 321 can continuously detect input current Iin2, and when input current Iin2 reaches the level of reference current Iref2, current compensation signal Icom2 may be less than voltage compensation signal Vcom2. Then, selection circuit 323 can select current compensation signal Icom2 as the control signal to control circuit module 2 to switch to operate under the current control mode, in order to keep input current Iin2 at reference current Iref2.

Since circuit module 2 can operate prior to circuit module 1 in the system, voltage control circuit 322 may sample input voltage source Vin1 first when input voltage source Vin1 is provided to circuit module 1. Then, reference voltage Vref can be adjusted to be the sum of input voltage source Vin1 and threshold offset2, such that output voltage Vout2 may be controlled to be maintained at Vin1+offset2. Since output voltage Vout1 is expected to be the difference between input voltage source Vin1 and threshold offset1, as output voltage Vout2 rises to the level of reference voltage Vref that is greater than input voltage source Vin1, power switch Q1 may be turned off finally. After that, input voltage source Vin2 can independently provide the full power for the load. In this way, circuit module 2 can preferentially provide power for the load without additional control.

As the load increases, input current Iin2 can gradually increase until input current Iin2 reaches the level of reference current Iref2. Then, current compensation signal Icom2 can be selected by selection circuit 323 as the control signal to control circuit module 2, in order to switch to operate under the current control mode to maintain input current Iin2 at reference current Iref2. If the load continues to increase, output voltage Vout2 can gradually decrease. When output voltage Vout2 decreases to be the difference between input voltage source Vin1 and threshold offset1, voltage control circuit 312 can adjust the conduction state of power switch Q1 to control output voltage Vout1 to be the difference between input voltage source Vin1 and threshold offset1. That is, the output voltage of the multi-input single-output circuit may remain at the difference between input voltage source Vin1 and threshold offset1. After that, input voltage sources Vin1 and Vin2 can jointly provide power for the system.

In one case, input voltage sources Vin1 and Vin2 may be provided to circuit modules 1 and 2 respectively at the same time. If circuit module 2 is controlled to preferentially operate in the system, voltage control circuit 322 can control reference voltage Vref to be the sum of input voltage source Vin1 and threshold offset2. If the soft-start of circuit module 1 finishes before the soft-start of circuit module 2, circuit module 1 may operate under the voltage control mode first. Then, output voltage Vout1 can be controlled to be maintained at the difference between input voltage source Vin1 and threshold offset1. After the soft-start of circuit module 2 finishes, voltage control circuit 322 can control the on and off states of power switch Q2, such that output voltage Vout2 is controlled to be maintained at reference voltage (e.g., the sum of input voltage source Vin1 and threshold offset2).

When output voltage Vout2 supplies power for circuit module 2, power switch Q1 may be turned off finally. After that, input voltage source Vin2 can provide the whole current for the load. If the soft-start of circuit module 2 finishes before the soft-start of circuit module 1 finishes, voltage control circuit 322 can control output voltage Vout2 to be reference voltage Vref (e.g., the sum of input voltage source Vin1 and threshold offset2). In such a case, power switch Q1 may be turned off before the soft-start of circuit module 1 finishes. After that, input voltage source Vin2 can provide the whole current for the load.

Figure 5:
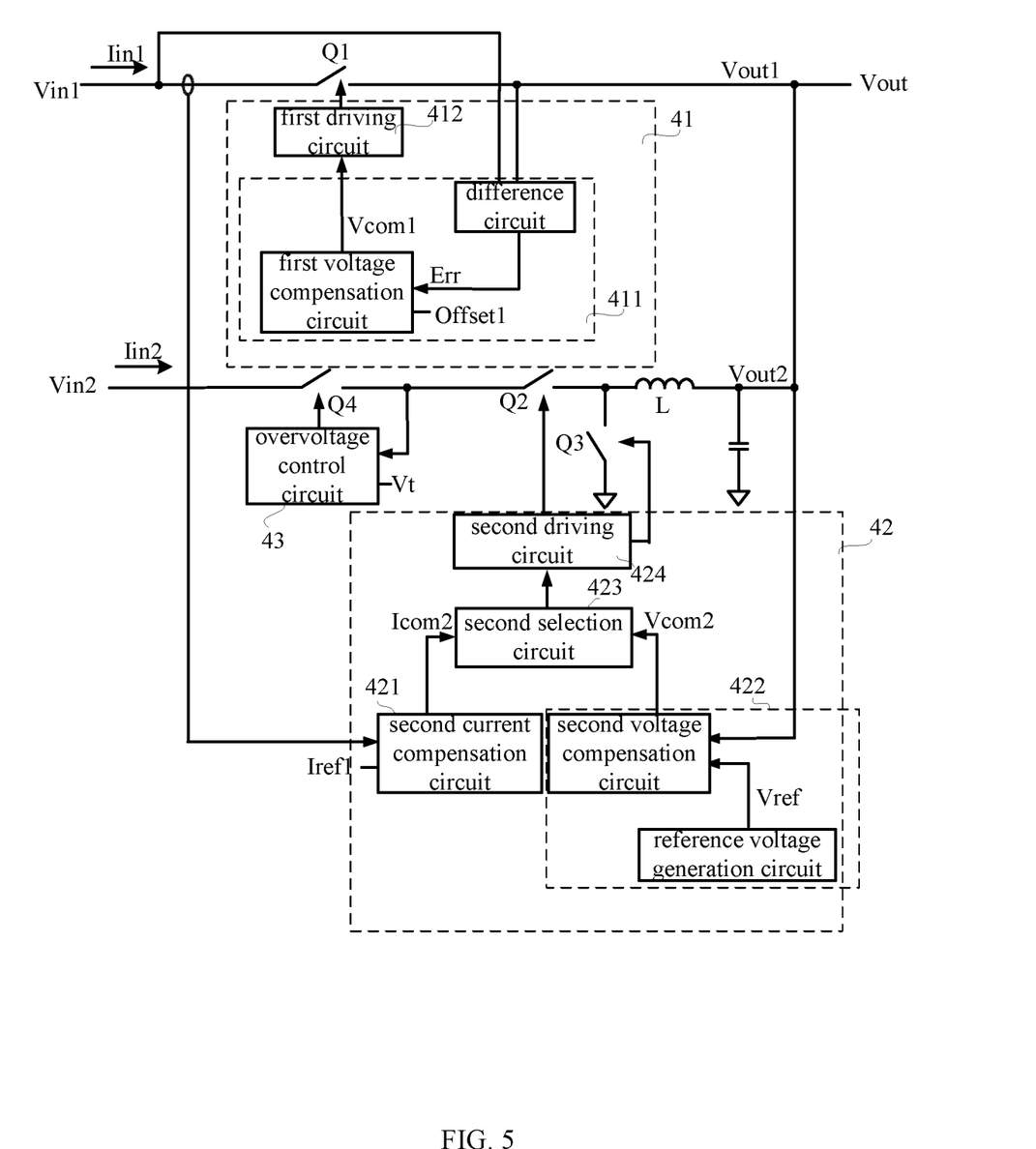
FIG. 5 is a schematic block diagram of a second example control circuit of the multi-input single-output circuit, in accordance with embodiments of the present invention.

Referring now to FIG. 5, shown is a schematic block diagram of a second example control circuit of the multi-input single-output circuit, in accordance with embodiments of the present invention. For example, circuit module 1 may operate prior to circuit module 2. In this particular example, the control circuit can include control circuits 41 and control circuit 42, and overvoltage control circuit 43. For example, control circuit 41 can include voltage control circuit 411. The structure and operation principle of voltage control circuit 411 can be the same as that of voltage control circuit 312 in FIG. 3. For example, voltage control circuit 411 can generate voltage compensation signal Vcom1, in order to control the conduction state of power switch Q1, such that the difference between input voltage source Vin1 and output voltage Vout1 is controlled to be threshold offset1. In this example, voltage compensation signal Vcom1 may be transmitted to driving circuit 412 directly to generate a driving signal.

Control circuit 42 can include current control circuit 421, voltage control circuit 422, and selection circuit 423. Current control circuit 421 can include a second current compensation circuit, which may receive input current Iin1 and reference current Iref1, and can generate current compensation signal Icom2 when input current Iin1 is greater than reference current Iref1, thereby controlling the on and off states of power switch Q2 to maintain input current Iin1 at reference current Iref1. Moreover, reference current Iref1 can be the maximum of input current Iin1. Voltage control circuit 422 can include a reference voltage generation circuit and a second voltage compensation circuit. For example, the reference voltage generation circuit can generate different reference voltages in different applications.

The second voltage compensation circuit can compare output voltage Vout2 against reference voltage Vref, in order to generate voltage compensation signal Vcom2, thereby controlling output voltage Vout2 to be maintained at reference voltage Vref. Selection circuit 423 can compare current compensation signal Icom2 against voltage compensation signal Vcom2, and then may select the larger one as a control signal. In addition, control circuit 42 can also include driving circuit 424. Driving circuit 424 can generate a driving signal, in order to control power switches Q2 and Q3 according to the control signal generated by selection circuit 423.

Figure 6:
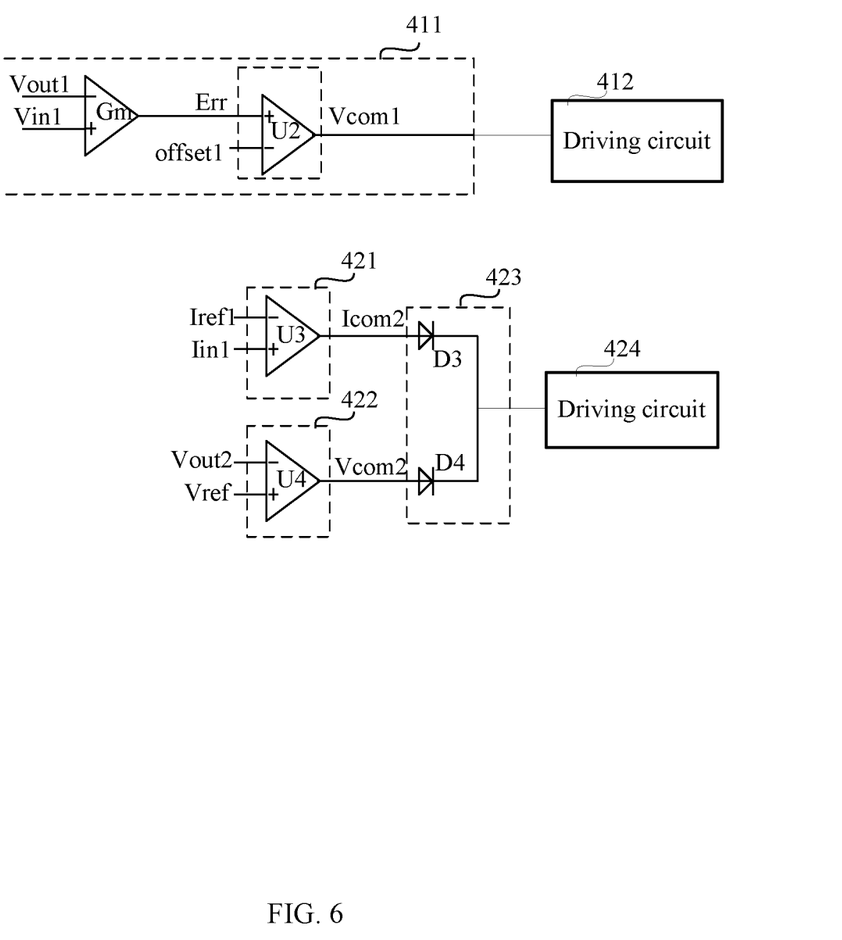
FIG. 6 are schematic block diagrams of an example first and second control sub-circuits of the second example control circuit, in accordance with embodiments of the present invention.

Referring now to FIG. 6, shown are schematic block diagrams of first and second control sub-circuits of the second example control circuit, in accordance with embodiments of the present invention. In this particular example, control circuit 41 can include voltage control circuit 411, which may be the same or similar as voltage control circuit 312 in FIG. 5. Here, voltage compensation signal Vcom1 can be transmitted to driving circuit 412 directly. The second current compensation circuit can include error amplifier U3. In this particular example, the non-inverting input terminal of error amplifier U3 may receive input current Iin1, the inverting input terminal of error amplifier U3 may receive reference current Iref1, and an output terminal of error amplifier U3 can generate current compensation signal Icom2. When input voltage source Vin1 is provided to circuit module 1, reference voltage Vref generated by the reference voltage generation circuit can begin to decrease from the desired voltage, such that the second current compensation circuit can function.

In one case, input voltage source Vin2 may be provided to circuit module 2 after input voltage source Vin1 is provided to circuit module 1. Thus, circuit module 1 can be controlled to operate under the voltage control mode first, thereby controlling output voltage Vout1 to be the difference between input voltage source Vin1 and threshold offset1. When detecting that input voltage source Vin1 is provided to circuit module 1, the reference voltage generation circuit in voltage control circuit 422 can adjust reference voltage Vref, in order to make it less than the output voltage of the multi-input single-output circuit (e.g., equal to Vin1−offset1), such that voltage compensation signal Vcom2 becomes zero. In addition, since input current Iin1 is less than reference current Iref1 at the beginning, current compensation signal Icom2 can be zero to control power switch Q2 to be turned off. After that, input voltage source Vin1 may provide the whole current for the load. Therefore, circuit module 2 can be selected to preferentially operate in the system.

When input current Iin1 is greater than reference current Iref1, the reference voltage generation circuit may decrease reference voltage Vref to be less than Vout2, in order to guarantee that voltage compensation signal Vcom2 becomes zero, since the output voltage of the multi-input single-output circuit may decrease with the increase of the input current. Then, current compensation signal Icom2 can be greater than voltage compensation signal Vcom2. In that case, circuit module 2 may switch to operate under the current control mode to control input current Iin1 to be maintained at reference current Iref1 by controlling the switching states of power switch Q2. After that, input voltage sources Vin1 and Vin2 can jointly provide power for the load.

In one case, input voltage source Vin1 may be provided to circuit module 1 after input voltage source Vin2 is provided to circuit module 2. Before input voltage source Vin1 is provided to circuit module 1, circuit module 2 can operate under the voltage control mode to control output voltage Vout2 to be reference voltage Vref (e.g., the desired voltage). When input voltage source Vin1 is provided to circuit module 1, reference voltage Vref can be decreased, such that voltage compensation signal Vcom2 becomes zero. In addition, input current Iin1 can be less than reference voltage Iref1 at the beginning, such that current compensation signal Icom2 is zero to control power switch Q2 to be turned off. Also, voltage control circuit 411 can control the difference between input voltage source Vin1 and output voltage Vout1 to be threshold offset1. After that, input voltage source Vin1 may provide the whole current for the load. Therefore, circuit module 1 can be selected to preferentially operate in the system.

When input current Iin1 is greater than reference current Iref1, the reference voltage generation circuit may decrease reference voltage Vref. Then, current compensation signal Icom2 can be greater than voltage compensation signal Vcom2. In that case, circuit may switch 2 switches to operate under the current control mode, in order to control input current Iin1 to be maintained at reference current Iref1 by controlling the switching states of power switch Q2. After that, input voltage sources Vin1 and Vin2 may jointly provide current for the load.

In particular embodiments, when both of two input sources exist, the system can preferentially select one input voltage source, in order to supply power for the post stage, and to smooth switching between the two circuit modules. In this way, the efficiency of the system can be improved.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A multi-input single-output circuit, comprising:
   a) a first circuit module configured to receive a first input voltage source, and comprising a first power switch;
   b) a second circuit module configured to receive a second input voltage source, and comprising a switching power converter having a second power switch; and
   c) a control circuit configured to adjust a reference voltage according to the first input voltage source to control an output voltage of the second circuit module when the first input voltage source supplies power for the first circuit module, the second input voltage source supplies power for the second circuit module, and the second circuit module operates prior to the first circuit module, thereby controlling the first circuit module to stop operating.

2. The multi-input single-output circuit of claim 1, wherein the control circuit is configured to adjust operation states of the first and second circuit modules by adjusting the reference voltage characterizing an output voltage of the second circuit module.

3. The multi-input single-output circuit of claim 1, wherein the control circuit is configured to control an output voltage of the second circuit module according to the first input voltage source or an input current of the first circuit module.

4. The multi-input single-output circuit of claim 1, wherein the control circuit comprises a first control circuit configured to generate a first control signal to control the first power switch to operate in a linear mode, and a second control circuit configured to generate a second control signal to control the second power switch to operate in a switching mode.

5. The multi-input single-output circuit of claim 1, wherein the control circuit comprises a first voltage control circuit configured to generate a first voltage compensation signal to control the first circuit module to operate in a voltage control mode according to the first input voltage source and a first threshold, thereby controlling a difference between the first input voltage source and an output voltage of the first circuit module to be maintained at the first threshold.

6. The multi-input single-output circuit of claim 5, wherein the control circuit further comprises:
   a) a first current control circuit configured to generate a first current compensation signal to control the first circuit module to operate in a current control mode according to an input current of the first circuit module and a first reference current, thereby controlling the input current of the first circuit module to be maintained at the first reference current; and
   b) a first selection circuit configured to select one of the first voltage compensation signal and the first current compensation signal as the first control signal, in order to control an operation state of the first power switch.

7. The multi-input single-output circuit of claim 1, wherein the control circuit comprises a second voltage control circuit configured to generate a second voltage compensation signal to control the second circuit module to operate in a voltage control mode according to the second input voltage source and the reference voltage, thereby controlling an output voltage of the second circuit module to be maintained at the reference voltage.

8. The multi-input single-output circuit of claim 7, wherein the second voltage control circuit comprises a reference voltage generation circuit configured to adjust the reference voltage to adjust an output voltage of the multi-input single-output circuit, thereby changing the first and second control signals.

9. The multi-input single-output circuit of claim 7, wherein the control circuit further comprises a second current control circuit configured to generate a second current compensation signal to control the first circuit module to operate in a current control mode according to an input current of the first circuit module and a first reference current, thereby controlling the input current of the first circuit module to be maintained at the first reference current.

10. The multi-input single-output circuit of claim 7, wherein the second circuit module further comprises a third power switch connected between the second input voltage source and an input terminal of the switching power converter, wherein the third power switch is turned on when the second input voltage source is not greater than an overvoltage protection threshold, and the third power switch is turned off when the second input voltage source is greater than the overvoltage protection threshold to realize overvoltage protection.

11. The multi-input single-output circuit of claim 7, wherein when the first input voltage source supplies power for the first circuit module, and the second input voltage source supplies power for the second circuit module, the second voltage control circuit is configured to adjust the reference voltage to be greater than the first input voltage source, thereby controlling the first circuit module to stop operating.

12. The multi-input single-output circuit of claim 11, wherein before the first input voltage source supplies power for the first circuit module, the second voltage control circuit is configured to adjust the reference voltage to be a desired voltage, and when the first input voltage source supplies power for the first circuit module, the second voltage control circuit is configured to adjust the reference voltage to be the sum of the first input voltage source and a second threshold.

13. The multi-input single-output circuit of claim 7, wherein when the first input voltage source supplies power for the first circuit module, and the second input voltage source supplies power for the second circuit module, and the first circuit module operates prior to the second circuit module, the second voltage control circuit is configured to adjust the reference voltage according to an output voltage of the multi-input single-output circuit thereby controlling the second circuit module to stop operating.

14. The multi-input single-output circuit of claim 13, wherein before the first input voltage source supplies power for the first circuit module, the second voltage control circuit is configured to adjust the reference voltage to be a desired voltage, and when the first input voltage source supplies power for the first circuit module, the second voltage control circuit is configured to decrease the reference voltage to be less than the desired output voltage of the multi-input single-output circuit, thereby controlling the second circuit module to stop operating.

15. The multi-input single-output circuit of claim 7, wherein the control circuit further comprises a second current control circuit configured to generate a second current compensation signal to control the second circuit module to operate in a current control mode according to an input current of the second circuit module and a second reference current, thereby controlling the input current of the second circuit module to be maintained at the second reference current.

16. The multi-input single-output circuit of claim 15, wherein the control circuit further comprises a second selection circuit configured to select one of the second voltage compensation signal and the second current compensation signal as the second control signal, in order to control on and off states of the switching power converter.

17. A control method for a multi-input single-output circuit comprising a first circuit module having a first power switch, and a second circuit module having a switching power converter, wherein the first circuit module receives a first input voltage source, and the second circuit module receives a second input voltage source, the method comprising:
  a) controlling one of the first and second circuit modules to supply power for a load, or to stop supplying power for the load, according to states of the first and second input voltage sources and control parameters of the circuit module being in operation;
  b) wherein the first power switch operates in a linear state, and a second power switch in the second circuit module operates in a switching state; and
  c) adjusting a reference voltage according to the first input voltage source to control an output voltage of the second circuit module when the first input voltage source supplies power for the first circuit module, the second input voltage source supplies power for the second circuit module, and the second circuit module operates prior to the first circuit module, thereby controlling the first circuit module to stop operating.

18. The method of claim 17, comprising:
  a) controlling operation states of the first and second circuit modules by adjusting a reference voltage characterizing an output voltage of the second circuit module; and
  b) controlling a circuit module to operate according to an input current of another circuit module which operates prior thereto.

19. The method of claim 17, further comprising, when the first input voltage source supplies power for the first circuit module, and the second input voltage source supplies power for the second circuit module, adjusting the reference voltage to be greater than the first input voltage source to control an output voltage of the second circuit module, thereby controlling the first circuit module to stop operating.

20. The method of claim 19, further comprising:
  a) sampling the first input voltage source;
  b) adjusting the reference voltage to be greater than the first input voltage source;
  c) controlling the output voltage of the second circuit module to be equal to the reference voltage to change a first control signal; and
  d) controlling the first power switch to be turned off according to the first control signal, wherein an input current of the second circuit module is not greater than a second reference current.

* * * * *